Nov. 12, 1929.　　　L. C. DUTRO　　　1,735,266
LUBRICATOR
Filed April 14, 1925　　　2 Sheets-Sheet 2

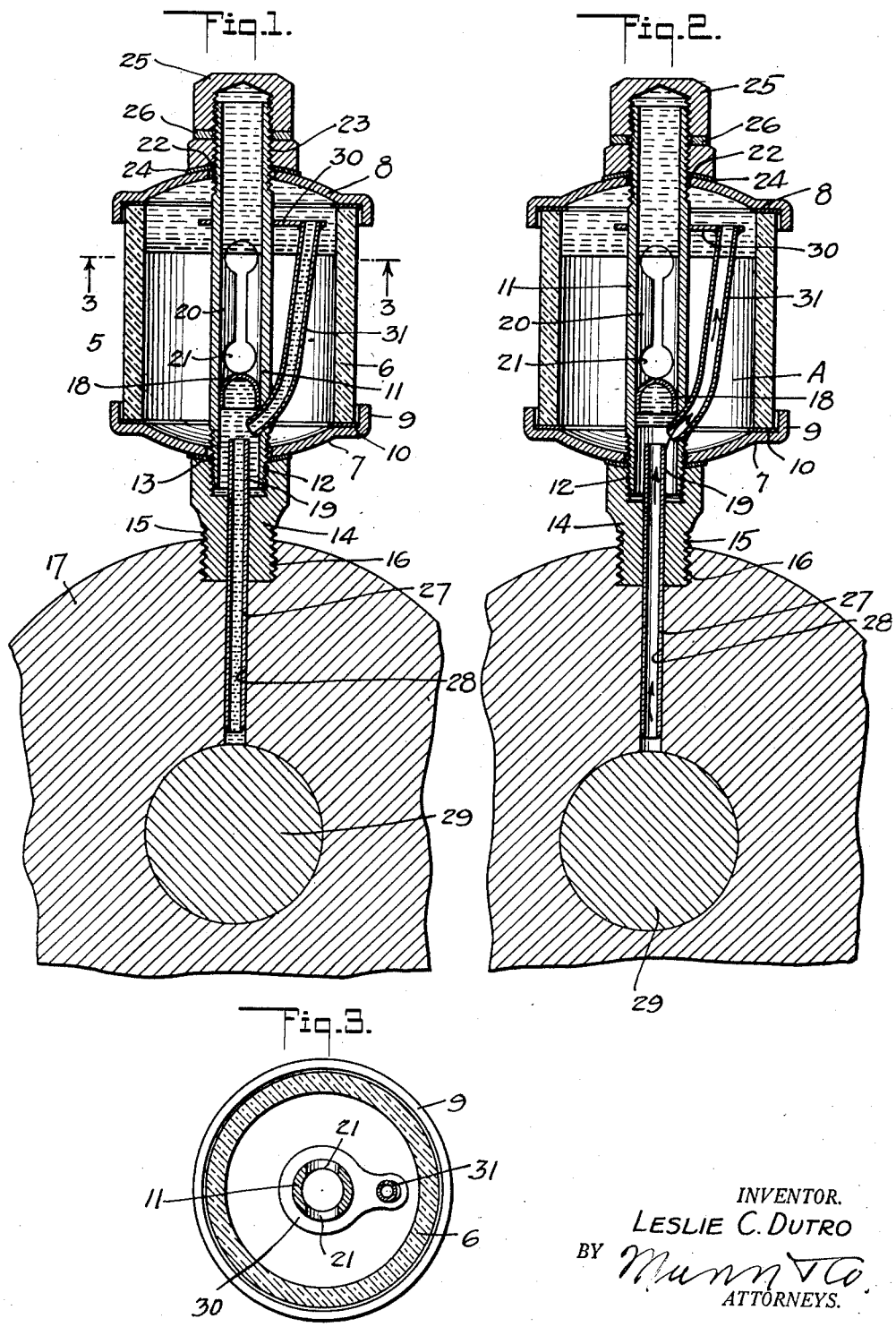

INVENTOR
LESLIE C. DUTRO
BY
ATTORNEY

Patented Nov. 12, 1929

1,735,266

UNITED STATES PATENT OFFICE

LESLIE C. DUTRO, OF LONG BEACH, CALIFORNIA

LUBRICATOR

Application filed April 14, 1925. Serial No. 23,142.

This invention relates to lubricators and particularly to those of the type embodying a reservoir or cup adapted to revolve with a pulley or the like around a bearing or shaft, and an object of the invention is to provide novel mechanism which is positive of action at all times and which functions automatically through the action of expansive force of air against a column or body of lubricant in the reservoir, so that the lubricant will be automatically fed to the bearing as the latter is heated and the supply of lubricant subsequently cut off from the bearing as the latter cools incident to proper lubrication thereof.

A still further object of the invention is to provide a lubricator embodying a reservoir adapted to revolve with a pulley, so that the lubricant will be maintained at a definite point in the reservoir by the action of centrifugal force, providing a space to one side of the lubricant which functions as a compression chamber for a body of heated or expanded air contained therein, and means located at the opposite end of the reservoir and arranged in open communication with the body of lubricant so that the latter, under the expansive action of the air, will be operatively fed to the bearing as the latter is heated.

I will describe only one form of lubricator embodying my invention and will then point out the novel features thereof in claims.

In the accompanying drawings,

Figure 1 is a vertical section through the lubricator showing the position of the lubricant to establish an active feed thereof to the bearing when the latter is heated;

Figure 2 is a similar view showing the position of the lubricant when the bearing cools incident to proper lubrication thereof; and Figure 3 is a transverse section taken on the line 3—3 of Figure 1;

Figure 4:
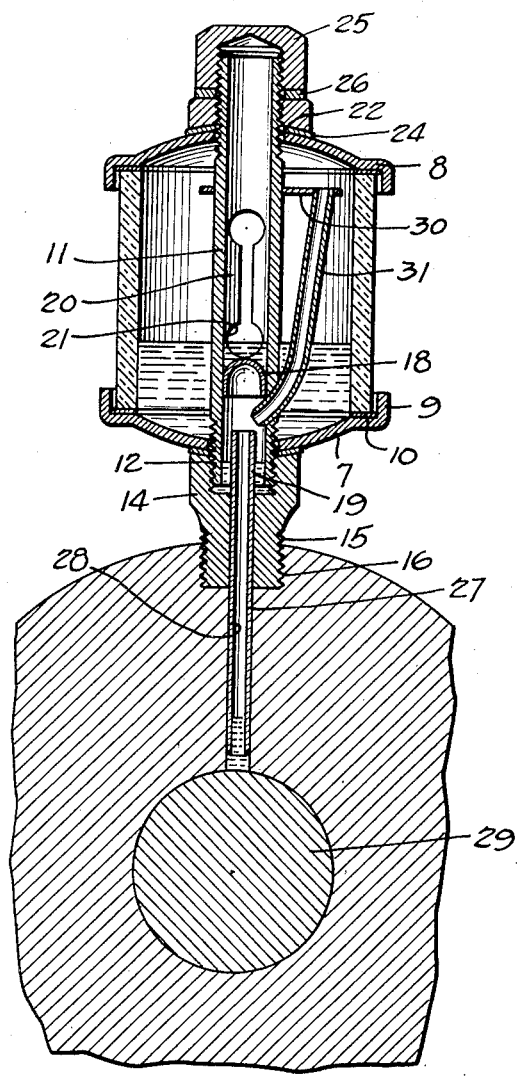
Figure 4 is a view similar to Figures 1 and 2 showing the lubricator and the position occupied by the lubricant therein when the member on which the lubricator is mounted is at rest.

In carrying the invention into practice, I use a cup or reservoir 5 consisting of a cylindrical glass body 6, an inner cap 7 and an outer cap 8. These caps are of concavo-convex form, and each is provided with an annular flange 9 which extends around the cup, as clearly shown in Figures 1 and 2. Between these caps and the respective ends of the cup are packing gaskets 10 of any suitable well-known form.

Leading through the reservoir axially thereof is a filler tube 11, the ends of which are extended beyond the caps 7 and 8, as shown. The inner end of this filler tube is threaded at 12, and same passes through an opening 13 in cap 7. This thread is engaged by a nipple 14 which is exteriorly threaded at 15 to engage in a threaded cavity 16 in the pulley 17.

Adjacent to the inner end of the filler is a closure or crown 18 which subdivides the tube into an inner well 19 and an outer space 20. The outer space opens to the reservoir by means of suitable orifices 21, preferably formed in the tube at diametrically opposite points thereof, as shown in Figure 3.

The opposite or outer end of the filler tube extends through an opening 22 in cap 8, and same is supplied with a jam nut 23 bearing against a gasket 24, and a closure cap 25 bearing against a gasket 26. In this manner the reservoir is firmly secured between the nipple 14 and the nut 23, while exposing the outer end of the tube 20 so that on removal of the cap 25, lubricant can be supplied to the filler tube to permit it, in turn, to pass to the reservoir by way of the orifices 21.

Leading from the nipple 14 is a distributing tube 27. This tube passes through a bore 28 in the pulley 17, the latter opening directly to the bearing or shaft 29 of the pulley. This distributing tube opens at its outer end to the inner end of the well 19. Fixed to the filler tube 20 near the outer end thereof is a plate 30, and opening onto the outer face of said plate is a tube or by-pass 31. The inner end of this tube or by-pass opens laterally into the aforesaid well 19, as shown in Figures 1 and 2.

Having described the mechanical details of construction, the operation and functioning of the lubricator is described as follows. Reference will first be had to Figure 1, wherein it shall be assumed that the pulley 17 is revolving around its fixed bearing or shaft 29. It shall be further assumed that the bearing is heated. Incident to the rotation of the pulley, it follows that by centrifugal force the lubricant contained in the reservoir 5 will be thrown to the outer end thereof to a point where it normally covers the outer end of the tube or by-pass 31. It may be stated that the reservoir is never filled to its capacity, and incident thereto it obviously appears that when the lubricant is thrown outwardly by the action of centrifugal force there is always provided within the reservoir at one side of the column of lubricant a space A, which may be aptly described as a compression chamber. Due to this functioning of the parts, the air contained in the chamber A expands as the bearing 29 becomes heated. This expansive action of air in the chamber A exerts its force in an outward direction against the column or body of lubricant at the outer end of the reservoir, and as a result the lubricant is forced through the tube or by-pass 31 and into the well 19. As long as the bearing remains heated, this expansive action of air in the chamber A remains effective and the well 19 is constantly supplied with a charge of lubricant so that it will immediately flow to the bearing 29 as long as the latter remains heated.

Reference will now be had to Figure 2, wherein it shall be assumed that the pulley is revolving and that the bearing 29 is in a normal working, cooled and properly lubricated state. At this time, atmospheric air is drawn into the chamber A, the well 19 and the tube 31 to replace the lubricant previously discharged from the reservoir. Also at this time, what oil remains in the well 19 has been thrown by centrifugal force to a point slightly beyond the lower end of the tube or by-pass 31. The lubricant contained in the reservoir has been forced by centrifugal action to the outer end of the reservoir as in the first instance. In this illustration, which demonstrates the relative action on the parts on the cooling of the bearing, it is manifest that the air in the reservoir at one side of the lubricant has contracted and atmospheric balance has been created so as to prevent any further discharge of lubricant to the well by way of the tube or by-pass 31. In this manner, the lubricator is positive of action and automatically controls itself in operative alternation with the respective heating and cooling of the bearing 29. By providing the well 19 at the inner end of the tube 20 and by by-passing the oil thereto from the outer end of the reservoir, I am able to cause the lubricant to promptly flow to the bearing as the latter becomes heated.

Although I have described only one form of lubricator embodying my invention, it is to be understood that various changes and modifications may be made in the same without departing from the spirit of my invention and the spirit and scope of the appended claims.

I claim as my invention:

1. A lubricator comprising a reservoir having a well, a tube having a partition therein defining the well and serving to permit lubricant to be supplied to the reservoir, the well having an outlet to a bearing, a tube leading from the well to a point near the outer end of the reservoir and a feed member connected to the free end of the tube.

2. A lubricator comprising a reservoir, a tube passing through the reservoir axially thereof, a cap closing one end of the tube, a well in the tube, the well having a lubricant distributor, the tube having orifices at one side of the well opening into the reservoir, and a by-pass tube communicating with the well and with the reservoir near the outer end thereof.

3. As a new article of manufacture, a lubricator adapted to be carried by a pulley so that by the action of centrifugal force, lubricant in the cup is normally maintained near the outer end of the cup, providing an air chamber at one side of the lubricant, the said cup having a well provided with a distributing tube, and means leading from the well to a point near the outer end of the cup so that under the action of expanded heated air in the chamber lubricant will be forced to the well, and whereby under action of contraction of the air in the chamber atmospheric air is drawn thereinto to cut off the well from the lubricant.

4. A lubricator comprising a body constituting a lubricant reservoir adapted to be secured to a rotatable member for rotation therewith, whereby lubricant in the reservoir will be thrown to one part of and normally retained in the latter under the action of centrifugal force so as to provide a chamber in the reservoir in which a quantity of air is trapped, the lubricant sealing the chamber against the admission of air so that only upon heating of the bearing of the member will the trapped air in the chamber be expanded sufficiently to exert a pressure against the lubricant and eject the latter from the reservoir, and means for conducting the ejected lubricant to the bearing.

5. A lubricator comprising a body constituting a lubricant reservoir adapted to be secured to a rotatable member for rotation therewith, whereby lubricant in the reservoir will be thrown to one part of and normally retained in the latter under the action of centrifugal force so as to provide a chamber in the reservoir in which a quantity of air is trapped, the lubricant sealing the chamber against the admission of air so that only upon heating of the bearing of the member will the trapped air in the chamber be expanded sufficiently to exert a pressure against the lubricant and eject the latter from the reservoir, and means for conducting the ejected lubricant to the bearing, said last means constituting an air passage when the bearing cools to permit air to be sucked into the chamber as a result of contraction of the air in the latter while cooling, to thereby replace with air the ejected lubricant.

6. A lubricator as embodied in claim 4 wherein said last means comprises a well adapted for communication with the bearing and a tube having one end thereof immersed in the lubricant during rotation of the body and its other end in communication with the well.

7. A lubricator comprising a body constituting a lubricant reservoir adapted to be secured to a rotatable member for rotation therewith, whereby lubricant in the reservoir will be thrown outwardly and normally retained in the reservoir under the action of centrifugal force so as to provide a chamber inwardly of the reservoir in which a quantity of air is trapped, a well, a tube immersed in the lubricant during rotation of the lubricator and communicating with the well, the lubricant sealing the chamber against the admission of air so that only upon heating of the bearing of the member will the trapped air in the chamber be expanded sufficiently to exert pressure upon the lubricant and eject the latter through the tube into the well, and a duct communicating with the well through which the ejected lubricant is adapted to be conducted to the bearing.

8. A lubricator comprising a body constituting a lubricant reservoir adapted to be secured to a rotatable member for rotation therewith, whereby lubricant in the reservoir will be thrown outwardly and normally retained in the reservoir under the action of centrifugal force so as to provide a chamber inwardly of the reservoir in which a quantity of air is trapped, a well, a tube immersed in the lubricant during rotation of the lubricator and communicating with the well, the lubricant sealing the chamber against the admission of air so that only upon heating of the bearing of the member will the trapped air in the chamber be expanded sufficiently to exert pressure upon the lubricant and eject the latter through the tube into the well, and a duct communicating with the well through which the ejected lubricant is adapted to be conducted to the bearing, said tube, well and duct constituting an air passage when the bearing cools to permit air to be sucked into the chamber as a result of contraction of the air in the latter while cooling, to thereby replace with air the ejected lubricant.

9. A lubricator comprising a body constituting a lubricant reservoir, a filling tube extending through the body and having openings communicating with the interior of the body, a removable closure for one end of the tube, a partition in the tube providing a well in the latter at its other end, a by pass tube communicating at one end with the well and terminating at its other end in the body at a point spaced from one end of the latter, a nipple on said other end of the filler tube by which the body is adapted to be connected to a rotatable member, and a distributing tube extending through the nipple into the well.

10. A lubricator comprising an open ended cylindrical body, caps closing the ends of the body to provide a lubricant reservoir and having registering axial openings, a filler tube extending through the body and having its ends projecting through said openings, a nut threaded on one end of the tube, a nipple threaded on the other end of the tube and co-operating with the nut to clamp the body and caps therebetween, a cap threaded on one end of the tube to close the latter, said tube having openings communicating with the interior of the body and provided with a partition to form a well at said other end of the tube, a by pass tube communicating at one end with the well and terminating at its other end in the body at a point spaced from the end of the latter, a plate supporting the free end of the by pass tube from the filler tube, and a distributing tube extending through said nipple into the well.

11. A lubricator comprising a body constituting a lubricant reservoir, and having a filling tube provided with an opening communicating with the interior of the body, a partition in the tube providing a well in the tube at one side of the partition, and a by-pass tube in the body communicating with the well and with the interior of the body.

12. A lubricator comprising a reservoir adapted to be secured to a pulley to rotate therewith and cause lubricant in the reservoir to be normally retained in one part of the latter under the action of centrifugal force so as to provide a chamber in the reservoir in which air is trapped, the reservoir having an outlet sealed by the lubricant when retained in said part of the reservoir, the outlet being disposed with respect to the reservoir for the ejection therefrom, of lubricant in the reservoir only when the air in said chamber is expanded sufficiently to exert pressure upon the lubricant.

LESLIE C. DUTRO.